United States Patent
Lin et al.

(10) Patent No.: US 11,782,731 B1
(45) Date of Patent: Oct. 10, 2023

(54) PERSISTING USER SETTINGS FOR NON-PERSISTENT APPLICATION STREAMING ENVIRONMENTS

(71) Applicant: Amazon Technologies, Inc., Seattle, WA (US)

(72) Inventors: Yang Lin, Seattle, WA (US); Himanshu Agrawal, Seattle, WA (US); Colin Stone, Seattle, WA (US); Prasad Renake, Seattle, WA (US); Murali Rathinasamy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 633 days.

(21) Appl. No.: 16/208,367

(22) Filed: Dec. 3, 2018

(51) Int. Cl.
  *G06F 9/445* (2018.01)
  *G06F 9/48* (2006.01)
  *G06F 9/455* (2018.01)

(52) U.S. Cl.
  CPC .......... *G06F 9/4451* (2013.01); *G06F 9/45558* (2013.01); *G06F 9/485* (2013.01); *G06F 2009/45579* (2013.01)

(58) Field of Classification Search
  CPC ..... G06F 9/4451; G06F 9/45558; G06F 9/485; G06F 2009/45579
  USPC ........................................................ 709/219
  See application file for complete search history.

(56) References Cited

U.S. PATENT DOCUMENTS

| | | | |
|---|---|---|---|
| 8,499,294 B2 | 7/2013 | Muckenhuber et al. | |
| 10,901,966 B2* | 1/2021 | Wang et al. | H04L 41/0806 |
| 10,911,299 B2* | 2/2021 | Hardy | H04L 67/535 |
| 2011/0061046 A1 | 3/2011 | Phillips | |
| 2013/0227564 A1* | 8/2013 | Asayama | G06F 16/176 718/1 |
| 2013/0346954 A1* | 12/2013 | Tryon et al. | G06F 8/65 717/168 |
| 2014/0282062 A1* | 9/2014 | Kapoor et al. | H04L 67/306 715/745 |
| 2015/0370650 A1* | 12/2015 | Tajima | G06F 21/608 707/647 |
| 2018/0131784 A1* | 5/2018 | Iyengar et al. | H04L 67/306 |
| 2018/0336079 A1* | 11/2018 | Soman et al. | G06F 9/548 |
| 2019/0058776 A1* | 2/2019 | Sylvain | H04L 67/01 |

* cited by examiner

*Primary Examiner* — Younes Naji
(74) *Attorney, Agent, or Firm* — Robert C. Kowert; Kowert, Hood, Munyon, Rankin & Goetzel, P.C.

(57) ABSTRACT

Methods, systems, and computer-readable media for persisting user settings for non-persistent application streaming environments are disclosed. An application streaming service may receive a selection of an application for a user and assign a compute instance to the user. An agent provided by the compute instance obtains a storage location of a user settings file associated with the user (e.g., based on use of the application during a previous session). The agent downloads the user settings file from the storage location to the compute instance and mounts the user settings file at a file system location associated with an execution environment of the compute instance. The application is executed and the user settings file is updated during use of the application. In response to termination of the session, the agent uploads the updated user settings file to a storage location. The user settings file is not persisted on the compute instance.

20 Claims, 6 Drawing Sheets

PERSISTING USER SETTINGS FOR NON-PERSISTENT APPLICATION STREAMING ENVIRONMENTS

BACKGROUND

Provider networks may offer, to users of a client company, access to computing resources and services implemented using a distributed system. When a user accesses a computing resource remotely, the resources may be said to reside "in the cloud" and may represent cloud computing resources. For example, a user at a remote client network may execute an application on a compute instance of an application streaming service of a provider network and view graphical output of the application locally on their own display device.

During a remote application session, a user may make updates to various application settings for the application. After the user finishes the remote session and logs out or otherwise terminates the session, the compute instance that was used to run the application may be recycled and/or the data on the compute instance may be deleted. However, the user may wish to have those updated application settings applied for the next time the user starts up a new application session using a different compute instance.

Traditional techniques for saving updates to user settings and applying those updates to subsequent sessions require a burdensome infrastructure that may slow performance and introduce additional points of failure. For example, using directory servers to implement an active directory solution (e.g., using a roaming profile with Microsoft® Active Directory) may require a significant investment in time and resources in order to set up, use, and maintain the system.

Figure 1:
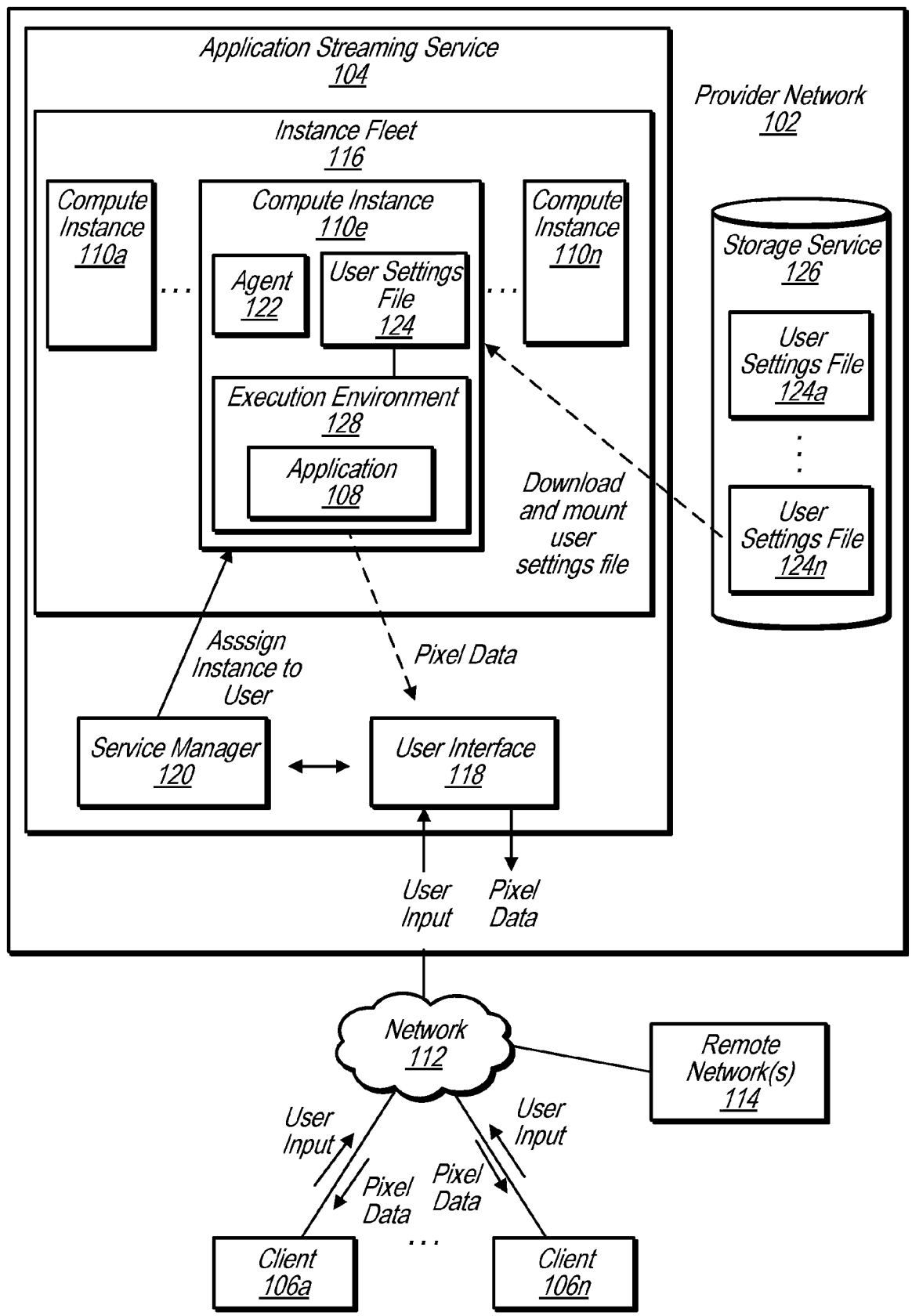
FIG. 1 illustrates a system for persisting user settings for non-persistent application streaming environments, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for persisting user settings for non-persistent application streaming environments. Embodiments may allow a user to execute an application on a compute instance (e.g., running on a host device), update user settings during use of the application during a session, and have the updated settings persisted (e.g., after the compute instance is terminated and/or recycled) so that the updated settings may be applied to the application during a subsequent session at a later time (e.g., using a different compute instance and/or different host device).

Various embodiments of methods, systems, and computer-readable media for persisting user settings for non-persistent application streaming environments are described. In embodiments, pixel data produced by execution of an application may be streamed to a remote user's computing device by an application streaming service of a provider network.

The provider network may include computing resources, such as compute instances, on which the application is executed. The resulting pixel data may represent a user interface of the application, and the pixel data may be displayed on the user's device (e.g., in a web browser or other suitable client software) while user input related to the application is potentially gathered on the user's device and returned to the application executing in the provider network. In embodiments, the application streaming service may provide an access address (e.g., a Uniform Resource Locator (URL) that can be accessed via a web browser) and may permit access to a particular set of users (e.g., as specified by an administrator for the client) for executing one or more applications.

In embodiments, any suitable security communication protocols may be used to protect data that is being sent between any devices, resources, and/or networks (e.g., provider network, client networks, remote networks, etc.). For example, data may be encrypted using SSL (secure socket layer), TLS (transport layer security), HTTPS (secure hypertext transfer protocol), and/or any other suitable network security protocol.

Embodiments described herein for persisting user settings for non-persistent application streaming environments may provide various advantages over traditional techniques. For example, traditional techniques for saving updates to user settings and applying those user settings to subsequent application sessions require a burdensome infrastructure, such as directory servers. Using an active directory solution, directory servers may be required to communicate with different storage servers to locate and retrieve various user settings/files (e.g., "user profiles"). The directory servers may then send the user profiles to another remote location where they may be applied to an application. The directory servers may transmit data to and receive data from the remote location during use of an application by a user at the remote location, which may consume a large amount of network traffic.

Using embodiments described herein, a compute instance (e.g., using an agent of the compute instance) may download a user settings file directly from a storage server without using a directory server or any other type of intermediate server. The user settings are applied to an application and changes to the user settings file may be made locally at the compute instance during an application session (e.g., without communicating over a network to a directory server or another remote device). Upon termination of the application session, the compute instance may upload the updated user settings file directly to a storage server without using a directory server or any other type of intermediate server. This may reduce the amount of network traffic/bandwidth used, reduce the amount of computing resources/infrastructure required to persist application settings (and thus reduce the number of failures/failure rate for persisting and applying user settings), and reduce the amount of time to required to apply persisted settings for new application sessions, compared to traditional techniques.

FIG. 1 illustrates a system for persisting user settings for non-persistent application streaming environments, according to one embodiment. The example provider network 102 includes an application streaming service 104 that may provide, to client computing devices 106 (e.g., a display device of a user of an application 108) of remote client networks, graphical representations of applications (e.g., via pixel data) that are executing using computing instances 110 of the provider network 102 instead of the client computing devices. For example, the client 106a may be a client computing device of a remote client network and the client 106n may be another client computing device of another remote client network. As depicted, a wide-area network 112 (e.g., the internet) may allow for communication of data between the remote clients 106 and the provider network and between client computing devices of one or more other remote networks 114 and the provider network.

The application streaming service 104 may include an instance fleet 116 that includes any number of compute instances 110 that may each execute one or more applications 108. In embodiments, a fleet of compute instance hosts (e.g., host servers or other host computing devices) may host the fleet of compute instances. For example, each compute instance host may host one or more of the compute instances 110. In one embodiment, the number of compute instances may grow or shrink as individual compute instances and/or instance hosts are provisioned (e.g., for users starting a new application session) or deprovisioned (e.g., for users terminating an existing application session).

In some embodiments, the application streaming service 104 may assign a computing instance to a particular user for executing a particular application. Thus, the provider network 100 may offer access to resources and services, such as the application streaming service 104 and compute instances 110a-110n, using multi-tenancy, such that different resources (e.g., compute instances) are used by (or on behalf of) different clients/users at any given time.

As depicted, the application streaming service 104 may include a user interface 118. In embodiments, the user interface 118 may include any suitable programmatic interfaces such as application programming interfaces (APIs) and/or any suitable user interfaces such as graphical user interfaces (GUIs). Using the user interface 118, a client administrator (e.g., a user with administrative roles or privileges) may configure the application streaming service for use by users of the client. For example, an administrator specify a set of authorized users and an indication of an access address (such as a URL) at which the application streaming service 104 can be accessed by users. In embodiments, the administrator may also configure whether or not persistence is enabled for each user (e.g., whether or not a user settings file is stored for the user as described herein). In embodiments, the service manager may enable (or disable) persistence for some or all of the users as a default configuration.

In embodiments, the administrator may also specify one or more applications that will be available for selection by one or more users for execution in an application session. Using the user interface 118, a user operating a client device may contact to the application streaming service 104, be authenticated and/or authorized to execute applications (e.g., based on user credentials provided by the user), select an application for execution from a list of available applications, and be sent displays of pixels or other pixel data that result from the execution of the selected application in the provider network 100.

As shown, the application streaming service 104 includes a service manager 120. The service manager 120 may perform various management (e.g., control-plane) operations of the application streaming service 104. For example, the service manager 120 may receive a selection of an application for a user (e.g., based on user input received at the user interface 118) and in response, assign a compute instance and/or an instance host to the user (e.g., the compute instance 110). In some embodiments, the service manager may assign an instance host to the user, instantiate a new compute instance on the instance host, and assign the new compute instance to the user. In embodiments, the compute instance includes at least the application selected by the user (e.g., installed on the compute instance).

In the depicted embodiment, a selected compute instance (e.g., compute instance 110e) includes/provides an agent 122. The agent 122 may be a component of the compute instance 110 that performs various operations associated with the compute instance. For example, the agent may obtain a storage location of a user settings file 124n associated with the user (e.g., a storage location at a remote network or within the provider network and remote from the compute instance). The user settings file may 124n may be stored at a data store of a storage service 126 of the provider network. The user settings file may include applications settings that were made during a previous application session of the user. As shown, any number of user settings files may be stored that correspond to any number of users.

In some embodiments, to obtain the storage location of the user settings file, the agent send, to the service manager, a request for the storage location of the user settings file associated with the user. The agent may then receive, from the service manager, the storage location of the user settings file. In embodiments, the agent may first determine whether the user settings file exists at the storage location (or exists at any storage location). If not, then the agent may create a new user file. If so, then the agent may obtain the location, as described above.

In embodiments, the agent may then download the user settings file from the storage location to the compute instance (e.g., from the storage service, from anther storage service/device of the provider network, or from a remote network). After the user settings file is downloaded, the agent may then mount the user settings file at a file system location associated with an execution environment 128 provided by the compute instance. The execution environment 128 may include hardware and/or software suitable for executing the selected application 108 (e.g., processors, memory, operating system/file system, storage, etc.). Thus, the agent may mount the user settings file at a file system location of an operating system running within the execution environment.

In some embodiments, the agent may download the user settings file from the storage location (e.g., from a storage server of the storage service) without using a directory server or any other intermediate server. As discussed above, this may provide various advantages over traditional techniques that use a burdensome computing infrastructure (e.g., using directory servers).

After the user settings file is mounted, the agent may perform one or more operations to set up the operating system/file system to use/apply the user settings when the application is executed. The execution environment may then execute the application in a session for the user in accordance with settings of the user settings file. For example, the execution environment may login the user to start a new application session (e.g., to start a remote desktop session for executing the application) using user credentials obtained from user input (for manual login of the user) and/or stored at the provider network (for automatic login of the user).

When the user login is successful, the execution environment may then launch/execute the selected application in accordance with settings of the mounted user settings file. For example, one or more settings specified by the user settings file (e.g., based on previous use of the application at a previous application session of the user) may be applied to the application. A setting may be any configurable aspect of the application (e.g., functions available for use, display settings, etc.).

In some embodiments, a state of the application may also be retrieved from the user settings file and applied to the application to allow the user to resume the application at the stored state. For example, the application state may include data had been entered into the application (e.g., words of a word processing document, graphics of a drawing program, or any other input data) during the previous application session and saved to the user settings file at a particular point in time (e.g., as a checkpoint/backup technique).

In embodiments, the execution environment may update one or more of the settings of the user settings file during use of the application (e.g., based on user input). In some embodiments, the execution environment and/or agent also stores an execution state of the application in the user settings file during use of the application (e.g., at periodic intervals or other points in time during execution).

In some embodiments, in response to termination of the session (e.g., due to closing of the application/session by the user or due to failure of the application/compute instance), the agent uploads the updated user settings file from the compute instance to the storage location (e.g., at the storage service) or to another storage location remote from the compute instance (e.g., to the storage service, anther storage service/device of the provider network, or a remote network). In embodiments, before the agent uploads the updated user settings file, the agent unmounts the updated user settings file from the file system location.

In embodiments, the user settings file is not persisted at the compute instance. For example, the user settings file may be deleted and/or removed from the compute instance in response to successful upload of the user settings file as part of an instance cleanup process. For example, the agent may perform one or more cleanup tasks on the compute instance that results in deletion or removal of the updated user settings file, the application, the execution environment, and/or any number of other components/data within the compute instance. As part of the cleanup processing, the compute instance itself may be removed from the instance host (e.g., by a command from the service manager) to free up resources of the instance host so that a new compute instance can be used on the host.

In various embodiments, the clients 106a-106n may be computing devices that correspond to users of the provider network 100, such as customers who seek to use services offered by the provider network. The users may represent persons, businesses, other organizations, and/or other entities. The clients 106 may encompass any type of client configurable to submit requests to provider network 100. For example, a given computing device may include a suitable version of a web browser, or it may include a plug-in module or other type of code module configured to execute as an extension to or within an execution environment provided by a web browser.

In some embodiments, a client application may include sufficient network protocol support (e.g., for a suitable version of Hypertext Transfer Protocol (HTTP)) for generating and processing network-based service requests without necessarily implementing full browser support for all types of network-based data. In some embodiments, clients 106 may be configured to generate network-based service requests according to a Representational State Transfer (REST)-style network-based services architecture, a document- or message-based network-based services architecture, or another suitable network-based services architecture.

In embodiments, the execution of an application may produce a pixel display or other set of pixel data that may be refreshed at appropriate intervals. The pixel data may represent a user interface of the application, e.g., including one or more windows or other graphical user interface (GUI) elements as would typically be generated by execution of the application on a particular operating system. In this manner, a graphical representation of execution of the application may be rendered in the provider network. The pixel data may be streamed to a client computing device. The pixel data may be displayed in an end user display, e.g., in a browser or other client software of the client. User input to the application (e.g., by mouse, trackpad, keyboard, touch input, and so on) may be gathered in the browser or client software and transmitted to the application executing in the provider network. In this manner, responsibility for executing the application and rendering its user interface may be delegated from the user's computing device to computing resources in the provider network, as specified in an execution environment, and the client device may merely display the results as streamed over a network connection.

It is contemplated that the provider network 102 may include additional components not shown, fewer components than shown, or different combinations, configurations, or quantities of the components shown. Aspects of the functionality described herein may be performed, at least in part, by components outside of the provider network 102.

Figure 2A:
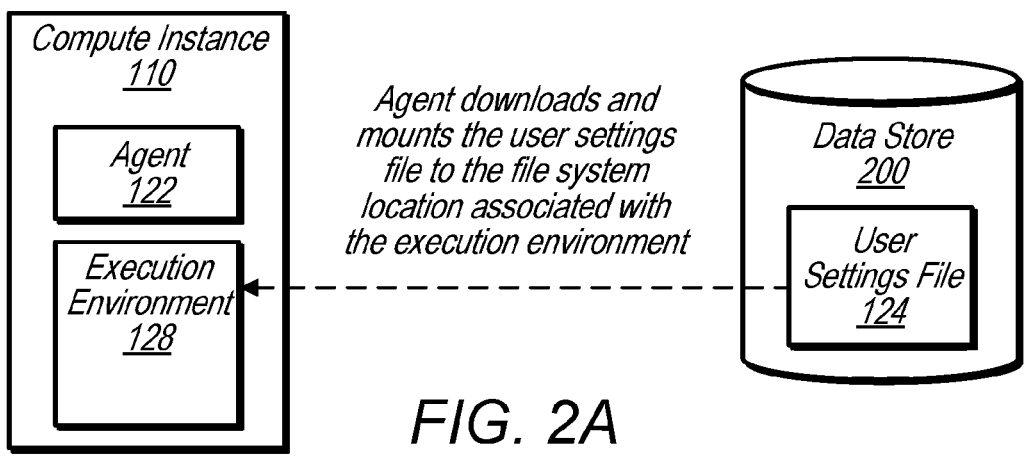
FIG. 2A illustrates aspects of a system for persisting user settings for non-persistent application streaming environments, including downloading a user settings file and mounting the user settings file at a file system location associated with an execution environment on a compute instance, according to one embodiment.

FIG. 2A illustrates aspects of a system for persisting user settings for non-persistent application streaming environments, including downloading a user settings file and mounting the user settings file at a file system location associated with an execution environment on a compute instance, according to one embodiment.

As depicted, an agent of a compute instance downloads a user settings file from a storage location at a data store 200 (e.g., a storage device of the provider network or a remote network). In embodiments, the storage location may be provided by the service manager (e.g., as a URL or other identifier of a location/address on a network). The agent may then mount the user settings file to a file system location associated with the execution environment (e.g., a file system location of an operating system).

Figure 2B:
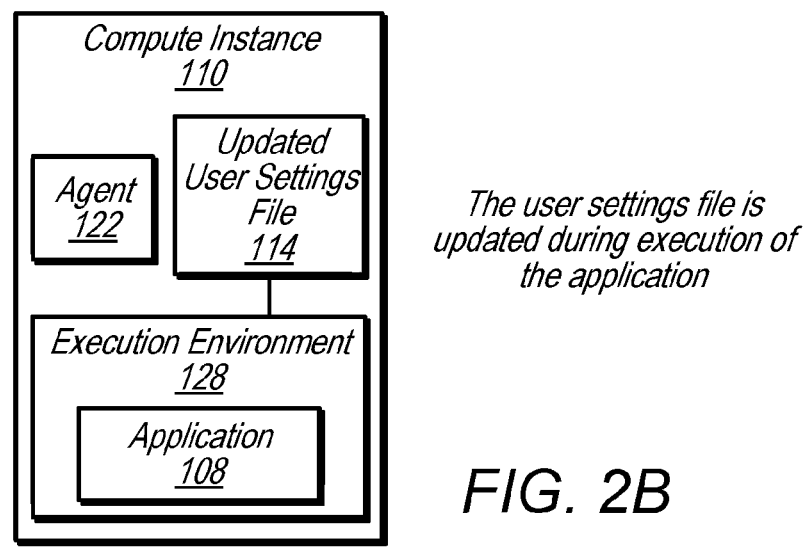
FIG. 2B illustrates aspects of a system for persisting user settings for non-persistent application streaming environments, including updating a user settings file during an application session on a compute instance, according to one embodiment.

FIG. 2B illustrates aspects of a system for persisting user settings for non-persistent application streaming environments, including updating a user settings file during an application session on a compute instance, according to one embodiment.

As shown, the user settings file is updated during use of the application by a user. For example, various forms of user input may make changes to one or more aspects of the application that result in corresponding changes to one or more settings for the application. Some or all of the changes to the settings for the application on the user settings file may be updated in response to the changes to the settings for the application (e.g., immediately or within a predetermined threshold period of time).

Figure 2C:
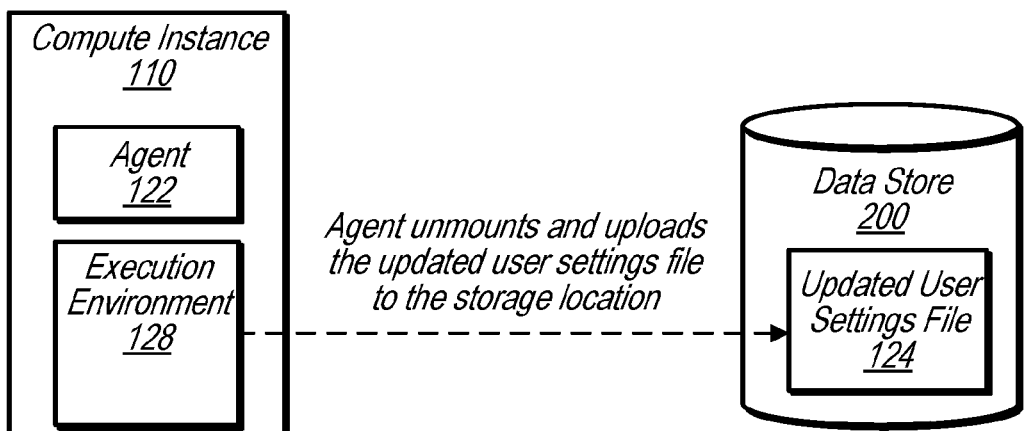
FIG. 2C illustrates aspects of a system for persisting user settings for non-persistent application streaming environments, including uploading an updated user settings file after termination of an application session, according to one embodiment.

FIG. 2C illustrates aspects of a system for persisting user settings for non-persistent application streaming environments, including uploading an updated user settings file after termination of an application session, according to one embodiment.

After termination of the application session, the agent unmounts the updated user settings file from the file system location. The agent then uploads updated user settings file to a storage location at the data store 200. In embodiments, the storage location may be the same storage location that the user settings file was downloaded from. In some embodiments, the storage location is a different location at the data store 200 or a different location at another storage device of the provider network or a remote provider network.

Figure 3:
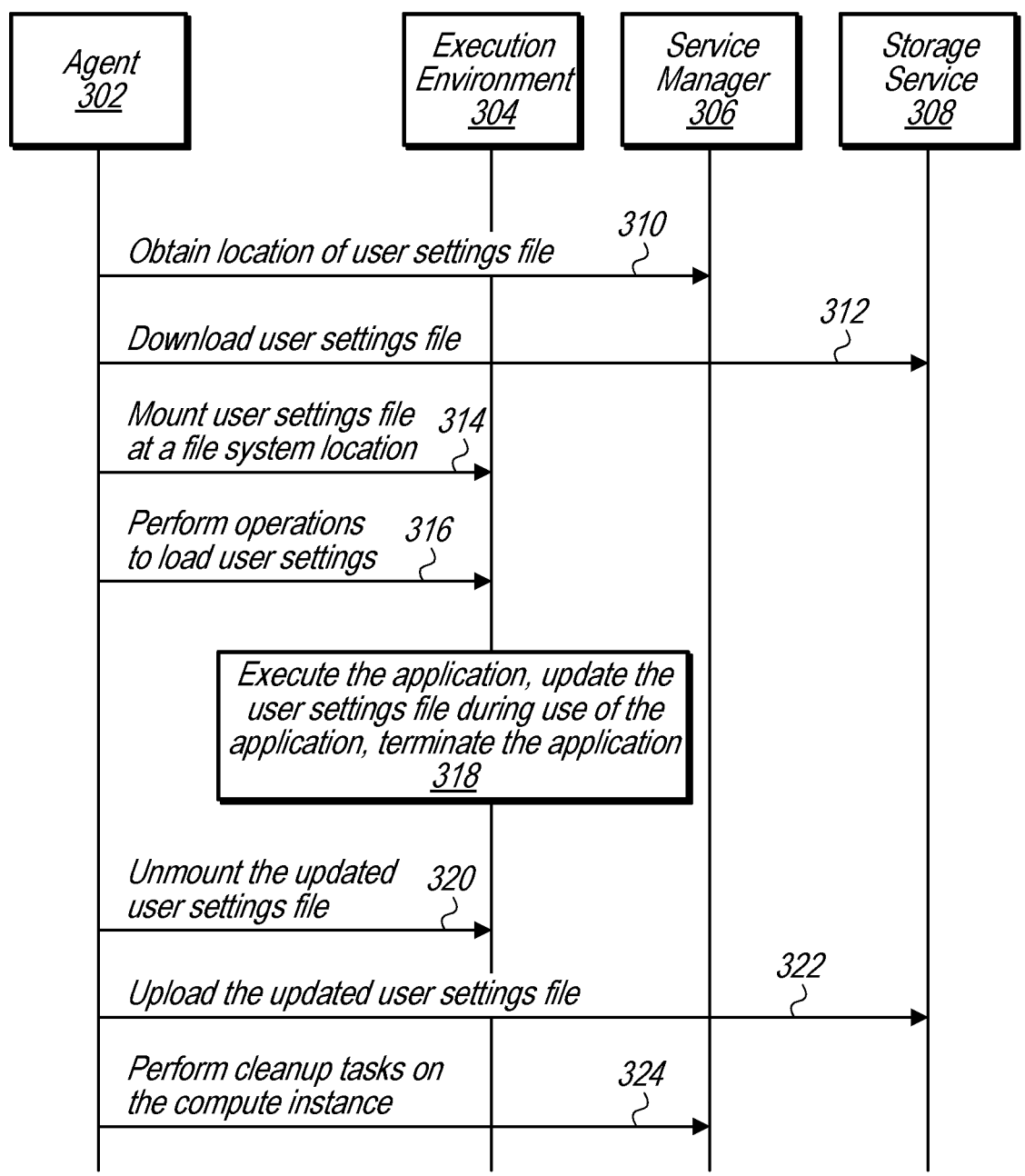
FIG. 3 illustrates various aspects of implementing persistent user settings for non-persistent application streaming environments, according to one embodiment.

FIG. 3 illustrates various aspects of implementing persistent user settings for non-persistent application streaming environments, according to one embodiment.

In the depicted embodiment, the agent 302, execution environment 304, service manager 306, and storage service 308 may represent examples of the agent, execution environment, service manager, and storage service of FIG. 1. As shown at step 310, an agent of a computing instance that is assigned to a user obtains, from a service manager of the application streaming service, a storage location of a user settings file.

At step 312, the agent downloads the user settings file from the storage service. At step 314, the agent may then mount the user settings file at a file system location of associated with the execution environment. In some embodiments, the user settings file may be considered a "virtual disk." Thus, the agent may mount the user settings file at the file system location as a virtual disk.

At step 316, the agent may perform one or more operations to load the user settings for use by the operating system and/or the application. This may involve linking folders, directories, and/or files to one or more locations of the file system that are associated with the application.

At step 318, the execution environment executes the application in accordance with settings of the user settings file, updates the user settings of the user settings file during use of the application, and terminates the application (e.g., in response to user input from the remote user). At step 320, the agent unmounts the updated user settings file from the file system location (or unmounts the virtual disk). At step 322, the agent uploads the updated user settings file to the storage location or to another storage location. Finally, at step 324, the agent performs one or more cleanup tasks on the compute instance (e.g., to re-provision the compute instance and/or the instance host).

Figure 4:
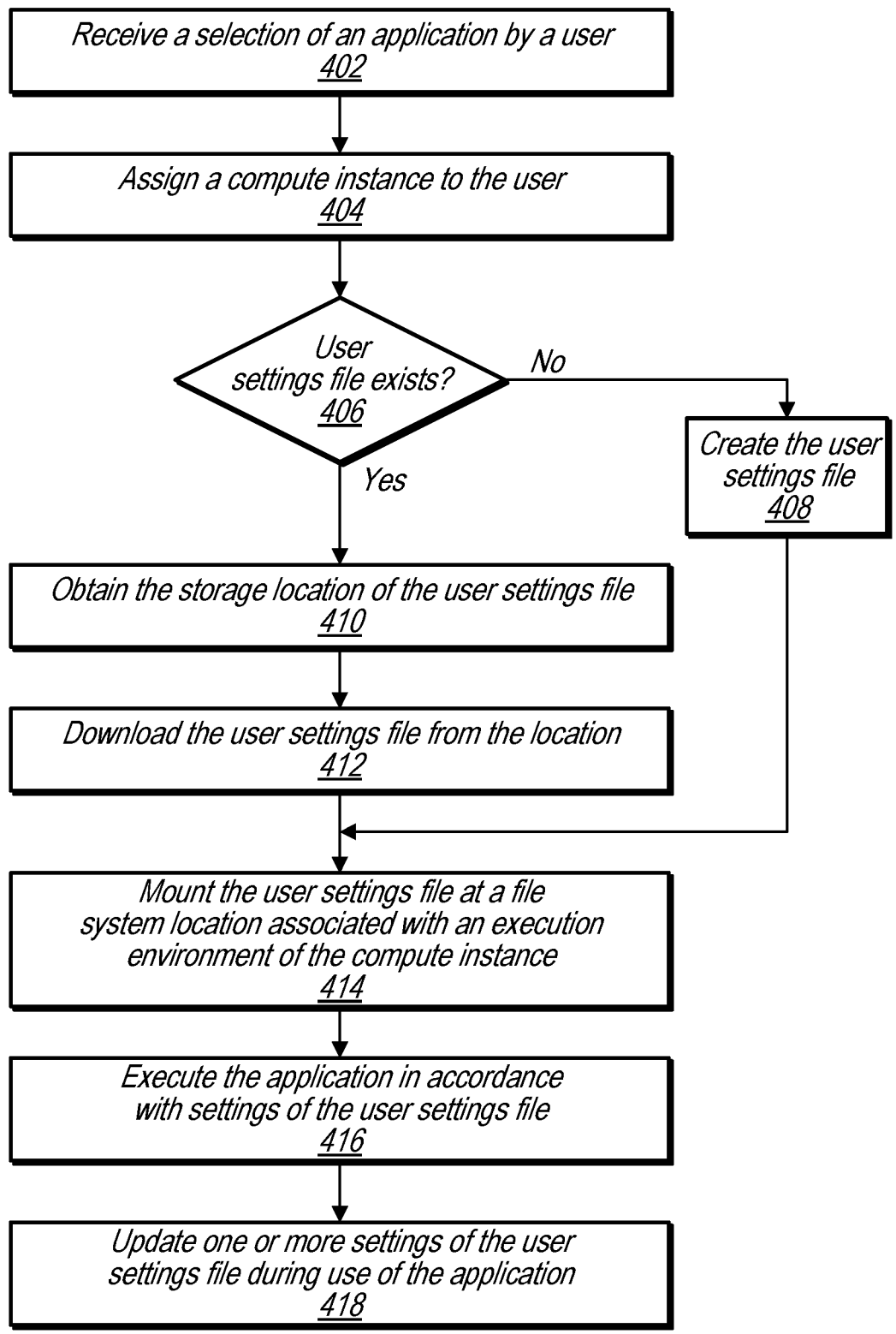
FIG. 4 is a flowchart illustrating a method for downloading user settings and executing an application on a compute instance in accordance with the user settings, according to one embodiment.

FIG. 4 is a flowchart illustrating a method for downloading user settings and executing an application on a compute instance in accordance with the user settings, according to one embodiment.

At block 402, an application streaming service receives a selection of an application by a user (e.g., via a user interface). The service manager may then receive the selection of the application for the user. In some embodiments, before receiving the selection from the user, the user must first log in to the application streaming service via user credentials for using the application streaming service. For example, the service manager may authenticate a user based on user credentials provided by the user via the user interface 118. At block 404, the application streaming service may assign a compute instance to the user.

At block 406, an agent of the compute instance determines whether a user settings file exists for the user. If not, then the process proceeds to block 414. If the user settings file exists, then at block 410, the agent obtains (e.g., from the service manager) the storage location of the user settings file. At block 412, the agent may then download the user setting file from the storage location.

In some embodiments, at block 406, the agent may determine whether persistence is "enabled" for the user setting file for the user (e.g., a flag or other indicator provided by the service manager to the agent may indicate whether or not persistence is enabled for the user). If persistence is enabled for the user, then the process may proceed as described above (e.g., determining whether the user profile settings exists, etc.). If persistence is not enabled for the user, then the process may end (e.g., no user settings file is created and/ or obtained).

At block 414, the agent mounts the user settings file at a file system location associated with an execution environment of the compute instance. At block 416, the execution environment then executes the application in accordance with settings of the user settings file. In some embodiments, before execution of the application, the user may first manually log in to gain access to the execution environment and/ or use of the application (e.g., by entering domain credentials and/or other login credentials). In embodiments, the user may log into a Microsoft® Windows operating system or any other type or brand of operating system that is suitable for executing the application. In some embodiments, the agent may automatically log in the user using user login credentials (e.g., provided by the service manager). In embodiments, these user login credentials may be the same or different credentials as those used at block 402 to log in to the application streaming service. At block 418, the execution environment updates one or more settings of the user settings file during use of the application (e.g., in response to one or more user inputs).

Figure 5:
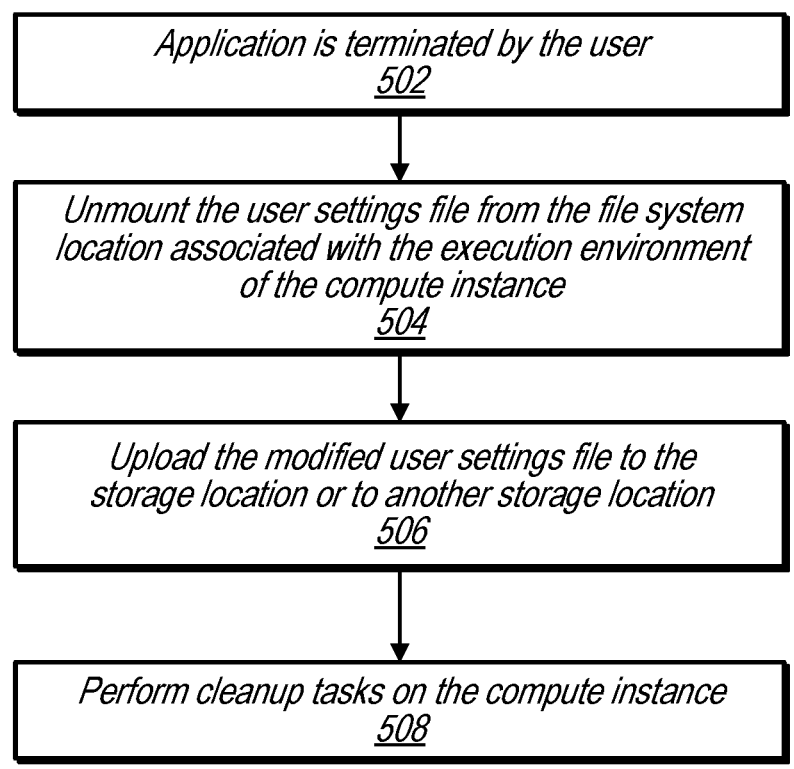
FIG. 5 is a flowchart illustrating a method for persisting updated user settings for a non-persistent application streaming environments, according to one embodiment.

FIG. 5 is a flowchart illustrating a method for persisting updated user settings for a non-persistent application streaming environments, according to one embodiment.

At block 502, the application is terminated by the user. At block 504, the agent unmounts the updated user settings file from the file system location associated with the execution environment. This may occur regardless of whether any settings of the user settings file were updated. However, in some embodiments, if the agent determines that the user settings file was not updated during use of the application, then the agent may not perform block 504 and/or block 506 (otherwise the agent may perform both blocks).

At block 506, the agent uploads the updated user settings file to the storage location (e.g., the location that the file was originally downloaded from) or to a different storage location. At block 508, the agent performs one or more cleanup tasks on the compute instance.

Any of various computer systems may be configured to implement processes associated with the provider network, remote networks, application streaming service, storage service, or any component of the above figures. For example, FIG. 6 is a block diagram illustrating an example computer system that implements some or all of the techniques described herein, according to some embodiments.

Figure 6:
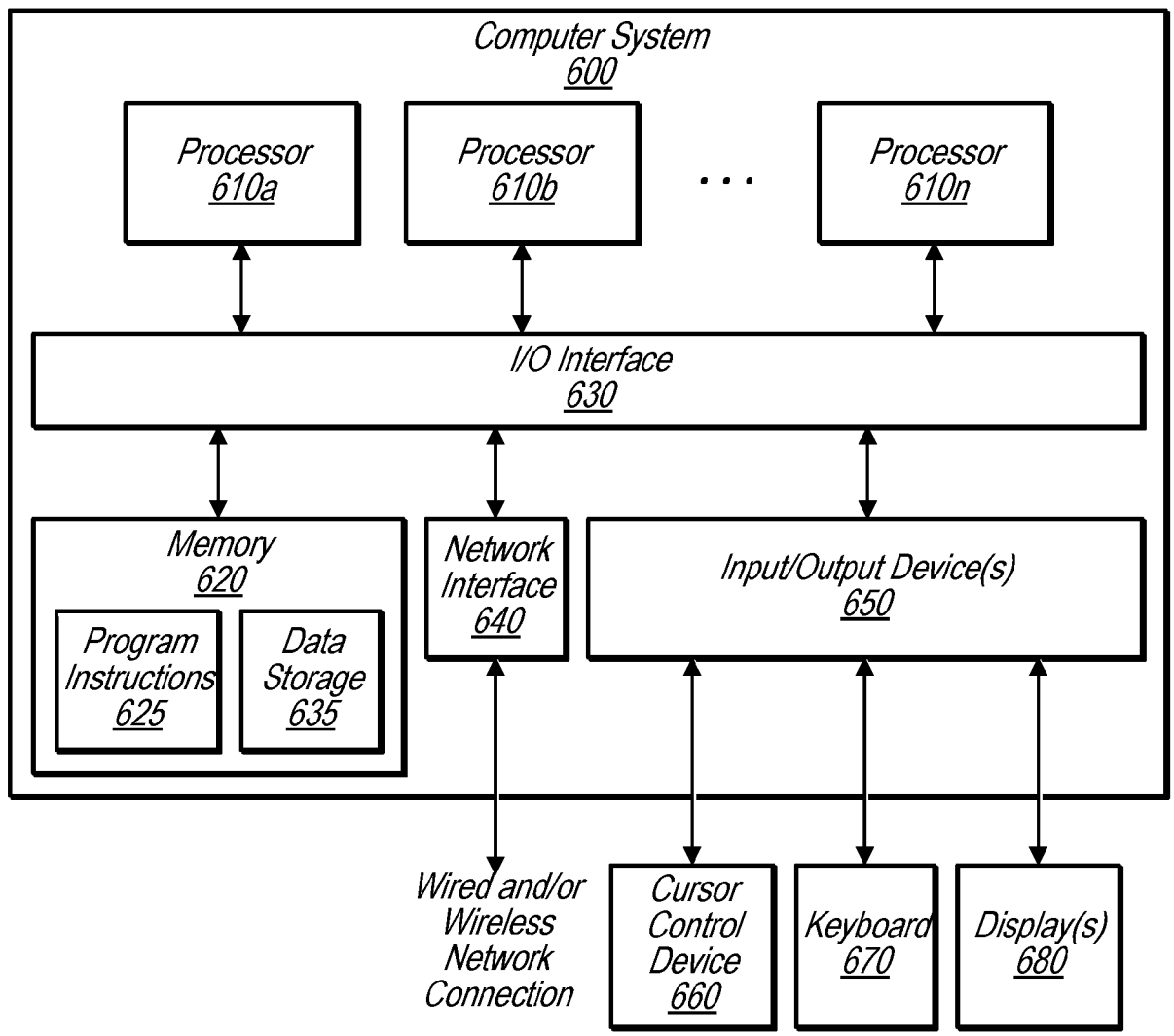
FIG. 6 is a block diagram illustrating an example computer system that implements some or all of the techniques described herein, according to some embodiments.

In various embodiments, the provider network, remote networks, application streaming service, storage service, or any other component of any of FIGS. 1-5 may each include one or more computer systems 600 such as that illustrated in FIG. 6. In embodiments, the provider network, remote networks, application streaming service, storage service, or any other component may include one or more components of the computer system 600 that function in a same or similar way as described for the computer system 600.

In the illustrated embodiment, computer system 600 includes one or more processors 610 coupled to a system memory 620 via an input/output (I/O) interface 630. Computer system 600 further includes a network interface 640 coupled to I/O interface 630. In some embodiments, computer system 600 may be illustrative of servers implementing enterprise logic or a downloadable application, while in other embodiments servers may include more, fewer, or different elements than computer system 600.

In various embodiments, computer system 600 may be a uniprocessor system including one processor 610, or a multiprocessor system including several processors 610 (e.g., two, four, eight, or another suitable number). Processors 610 may be any suitable processors capable of executing instructions. For example, in various embodiments, processors 610 may be embedded processors implementing any of a variety of instruction set architectures (ISAs), such as the x106, PowerPC, SPARC, or MIPS ISAs, or any other suitable ISA. In multiprocessor systems, each of processors 610 may commonly, but not necessarily, implement the same ISA.

System memory 620 may be configured to store instructions and data accessible by processor 610. In various embodiments, system memory 620 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the provider network, client devices/networks, or remote networks are shown stored within system memory 620 as program instructions 625. In some embodiments, system memory 620 may include data 635 which may be configured as described herein.

In one embodiment, I/O interface 630 may be configured to coordinate I/O traffic between processor 610, system memory 620 and any peripheral devices in the system, including through network interface 640 or other peripheral interfaces. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments, some or all of the functionality of I/O interface 630, such as an interface to system memory 620, may be incorporated directly into processor 610.

Network interface 640 may be configured to allow data to be exchanged between computer system 600 and other computer systems 600 or devices attached to a network, such as the local network discussed above, a wide-area network, or a local network within the provider network, for example. In particular, network interface 640 may be configured to allow communication between computer system 600 and/or various I/O devices 650. I/O devices 650 may include scanning devices, display devices, input devices and/or other communication devices, as described herein. Network interface 640 may commonly support one or more wireless networking protocols (e.g., Wi-Fi/IEEE 802.11, or another wireless networking standard). However, in various embodiments, network interface 640 may support communication via any suitable wired or wireless general data networks, such as other types of Ethernet networks, for example. Additionally, network interface 640 may support communication via telecommunications/telephony networks such as analog voice networks or digital fiber communications networks, via storage area networks such as Fibre Channel SANs, or via any other suitable type of network and/or protocol.

In some embodiments, system memory 620 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 600 via I/O interface 630. A computer-readable storage medium may also include any volatile or non-volatile media such as RAM (e.g. SDRAM, DDR SDRAM, RDRAM, SRAM, etc.), ROM, etc., that may be included in some embodiments of computer system 600 as system memory 620 or another type of memory. Further, a computer-accessible medium may include transmission media or signals such as electrical, electromagnetic, or digital signals, conveyed via a communication medium such as a network and/or a wireless link, such as may be implemented via network interface 640.

In some embodiments, I/O devices 650 may be relatively simple or "thin" client devices. For example, I/O devices 650 may be configured as dumb terminals with display, data entry and communications capabilities, but otherwise little computational functionality. However, in some embodiments, I/O devices 650 may be computer systems configured similarly to computer system 600, including one or more processors 610 and various other devices (though in some embodiments, a computer system 600 implementing an I/O device 650 may have somewhat different devices, or different classes of devices).

In various embodiments, I/O devices 650 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 650 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 600. In general, an I/O device 650 (e.g., cursor control device 660, keyboard 670, or display(s) 680 may be any device that can communicate with elements of computing system 600.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the application streaming service and various services or devices of the provider networks, remote networks, client networks, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
  one or more computing devices of a provider network comprising respective processors and memory to implement an application streaming service for a plurality of clients to, for individual users of the plurality of clients:
    perform, by a service manager of the application streaming service:
      receive a selection of an application for a user; and
      assign a compute instance to the user, wherein the compute instance is hosted by a compute instance host selected from a plurality of compute instance hosts of the application streaming service;
    perform, by an agent provided by the compute instance:
      obtain, by the agent of the compute instance from a location external to the compute instance, a storage location of a user settings file associated with the user assigned to the compute instance of the application streaming service, wherein the storage location is at a remote network or within the provider network and remote from the compute instance;
      in response to the obtaining, by the agent of the compute instance, of the storage location of the user setting file, download, by the agent of the compute instance, the user settings file from the storage location to the compute instance; and
      subsequent to the downloading, by the agent of the compute instance, of the user settings file from the storage location to the compute instance, mount, by the agent of the compute instance, the user settings file at a file system location associated with an execution environment provided by the compute instance;
    perform, by the execution environment:
      subsequent to the downloading, by the agent of the compute instance, of the user settings file to the compute instance, initiate execution of the application within the execution environment provided by the compute instance in a session for the user in accordance with settings of the user settings file, wherein the agent is implemented by the compute instance external to the execution environment provided by the compute instance; and
      update one or more of the settings of the user settings file during use of the application; and
    in response to termination of the session, upload, by the agent, the updated user settings file from the compute instance to the storage location or to another storage location remote from the compute instance, wherein the user settings file is not persisted at the compute instance.

2. The system as recited in claim 1, wherein the one or more computing devices are configured to implement the application streaming service to:
  download the user settings file from the storage location without using a directory server.

3. The system as recited in claim 1, wherein the one or more computing devices are further configured to implement the application streaming service to, subsequent to the termination of the session:
  perform, by the service manager of the application streaming service:
    receive another selection of the application for the user;
    assign a different compute instance to the user; and
  perform, by another agent provided by the different compute instance:
    obtain a storage location of the updated user settings file;
    download the updated user settings file from the storage location of the updated user settings file to the different compute instance; and
    mount the updated user settings file at a file system location associated with another execution environment provided by the different compute instance;
  perform, by the other execution environment:
    execute the application in another session for the user in accordance with the one or more updated settings of the updated user settings file.

4. The system as recited in claim 1, wherein to obtain the storage location of the user settings file associated with the user, the agent is configured to:
  send, to the service manager of the application streaming service, a request for the storage location of the user settings file associated with the user; and receive, from the service manager, the storage location of the user settings file.

5. The system as recited in claim 1, wherein the one or more computing devices are configured to implement the application streaming service to:
perform, by the agent of the compute instance:
prior to the upload of the updated user settings file to the storage location or to the other storage location, unmount the updated user settings file from the file system location associated with the execution environment of the compute instance; and
perform one or more cleanup tasks on the compute instance.

6. A method comprising:
for individual users of an application streaming service of a provider network:
performing, by a service manager of the application streaming service:
receiving a selection of an application for a user; and
assigning a compute instance to the user;
performing, by an agent provided by the compute instance:
obtaining, by the agent of the compute instance from a location external to the compute instance, a storage location of a user settings file associated with the user assigned to the compute instance of the application streaming service;
in response to the obtaining, by the agent of the compute instance, of the storage location of the user setting file, downloading, by the agent of the compute instance, the user settings file from the storage location to the compute instance; and
subsequent to the downloading, by the agent of the compute instance, of the user settings file from the storage location to the compute instance, mounting, by the agent of the compute instance, the user settings file at a file system location associated with an execution environment provided by the compute instance;
performing, by the execution environment:
subsequent to the downloading, by the agent of the compute instance, of the user settings file to the compute instance, initiating execution of the application within the execution environment provided by the compute instance in a session for the user in accordance with settings of the user settings file, wherein the agent is implemented by the compute instance external to the execution environment provided by the compute instance; and
updating one or more of the settings of the user settings file during use of the application; and
in response to termination of the session, uploading, by the agent, the updated user settings file from the compute instance to the storage location or to another storage location remote from the compute instance.

7. The method as recited in claim 6, further comprising: downloading the user settings file from the storage location without using a directory server.

8. The method as recited in claim 6, further comprising, subsequent to the termination of the session:
performing, by the service manager of the application streaming service:
receiving another selection of the application for the user;
assigning a different compute instance to the user; and
performing, by another agent provided by the different compute instance:

obtaining a storage location of the updated user settings file;
downloading the updated user settings file from the storage location of the updated user settings file to the different compute instance; and
mounting the updated user settings file at a file system location associated with another execution environment provided by the different compute instance;
performing, by the other execution environment:
executing the application in another session for the user in accordance with the one or more updated settings of the updated user settings file.

9. The method as recited in claim 8, further comprising:
performing, by the other execution environment:
update one or more of the updated settings of the updated user settings file at least an additional time during use of the application; and
in response to termination of the other session, upload, by the other agent, the additionally updated user settings file from the different compute instance to the storage location of the updated user settings file or to a different storage location remote from the compute instance.

10. The method as recited in claim 6, wherein the obtaining of the storage location of the updated user settings file comprises:
sending, from the agent to the service manager of the application streaming service, a request for the storage location of the user settings file associated with the user; and
receiving, from the service manager, the storage location of the user settings file.

11. The method as recited in claim 10, wherein the obtaining of the storage location of the updated user settings file further comprises:
prior to sending, from the agent to the service manager, the request for the storage location of the user settings file associated with the user, determining, by the agent, that the user settings file exists at the storage location.

12. The method as recited in claim 6, further comprising:
for another user of the application streaming service of a provider network:
performing, by the service manager of the application streaming service:
receiving a selection of the application for the other user; and
assigning a different compute instance to the other user;
performing, by another agent provided by the different compute instance:
determining that another user settings file associated with the other user does not exist;
creating a new user settings file associated with the other user; and
mounting the new user settings file at a file system location associated with another execution environment provided by the different compute instance;
performing, by the other execution environment:
executing the application in another session for the other user; and
storing one or more settings in the new user settings file during use of the application; and
in response to termination of the other session, uploading, by the other agent, the new user settings file from the different compute instance to a different storage location remote from the different compute instance.

13. The method as recited in claim 6, further comprising: performing, by the execution environment:
storing an execution state of the application in the user settings file during use of the application, wherein the stored execution state of the application is different than a previous execution state of the application during the session.

14. The method as recited in claim 6, further comprising:
performing, by the execution environment:
streaming pixel data to a computing device associated with the user, wherein the pixel data represents a user interface of the executing application.

15. One or more non-transitory computer-accessible storage media storing program instructions that when executed on or across one or more processors of a provider network cause the one or more processors to:
perform, by an agent of a compute instance of an application streaming service:
obtain, by the agent of the compute instance from a location external to the compute instance, a storage location of a user settings file associated with a user assigned to the compute instance of the application streaming service, and wherein the storage location is at a remote network or within the provider network and remote from the compute instance;
in response to the obtaining, by the agent of the compute instance, of the storage location of the user setting file, download, by the agent of the compute instance, the user settings file from the storage location to the compute instance; and
subsequent to the downloading, by the agent of the compute instance, of the user settings file from the storage location to the compute instance, mount, by the agent of the compute instance, the user settings file at a file system location associated with an execution environment provided by the compute instance;
perform, by the execution environment:
subsequent to the downloading, by the agent of the compute instance, of the user settings file to the compute instance, initiate execution of the application within the execution environment provided by the compute instance in a session for the user in accordance with settings of the user settings file, wherein the agent is implemented by the compute instance external to the execution environment provided by the compute instance; and
update one or more of the settings of the user settings file during use of the application; and
in response to termination of the session, upload, by the agent, the updated user settings file from the compute instance to the storage location or to another storage location remote from the compute instance.

16. The one or more storage media as recited in claim 15, wherein to download the user data file from the location, the program instructions when executed on or across the one or more processors cause the one or more processors to:
download the user settings file from the storage location without using a directory server.

17. The one or more storage media as recited in claim 15, wherein to obtain a storage location of a user settings file associated with a user of the compute instance, the program instructions when executed on or across the one or more processors cause the one or more processors to:
send, from the agent to an endpoint remote from the compute instance, a request for the storage location of the user settings file associated with the user; and
receiving, from the endpoint, the storage location of the user settings file.

18. The one or more storage media as recited in claim 17, further comprising program instructions that when executed on or across the one or more processors further cause the one or more processors to:
prior to the sending of the request for the storage location of the user settings file associated with the user, determine, by the agent, that the user settings file exists at the storage location.

19. The one or more storage media as recited in claim 15, further comprising program instructions that when executed on or across the one or more processors further cause the one or more processors to:
perform, by the execution environment:
store an execution state of the application in the user settings file during use of the application, wherein the stored execution state of the application is different than a previous execution state of the application during the session.

20. The one or more storage media as recited in claim 15, further comprising program instructions that when executed on or across the one or more processors further cause the one or more processors to:
perform, by the agent of the compute instance:
prior to the upload of the updated user settings file to the storage location or to the other storage location, unmount the updated user settings file from the file system location associated with the execution environment of the compute instance; and
perform one or more cleanup tasks on the compute instance.

* * * * *